(12) United States Patent
Bouiller et al.

(10) Patent No.: US 6,276,126 B1
(45) Date of Patent: Aug. 21, 2001

(54) AXISYMMETRIC, DIRECTABLE AND ADJUSTABLE TURBOJET-ENGINE EXHAUST NOZZLE

(75) Inventors: Philippe Pierre Vincent Bouiller, Samoreau; Gilles Alain Marie Charier, La Grande Paroisse; Gérard Ernest André Jourdain, Saintry sur Seine; Daniel Germain Alexis Kettler, Chartrettes; Gérard Marcel François Mandet, Fericy; Jackie Raymond Julien Prouteau, Villecresnes, all of (FR)

(73) Assignee: Societe Nationale d'Etude et de Construction de Moteurs d'Aviation (S.N.E.C.M.A.) (FR)

( * ) Notice: Subject to any disclaimer, the term of this patent is extended or adjusted under 35 U.S.C. 154(b) by 0 days.

(21) Appl. No.: 09/523,465

(22) Filed: Mar. 10, 2000

(30) Foreign Application Priority Data

Mar. 19, 1999 (FR) .................................................. 99.02934

(51) Int. Cl.[7] ..................................................... F02K 1/00
(52) U.S. Cl. ................. 60/232; 239/265.19; 239/265.35; 239/265.41; 239/265.39
(58) Field of Search ......................... 60/232; 239/265.35, 239/265.41, 265.19, 265.39

(56) References Cited

U.S. PATENT DOCUMENTS

| | | |
|---|---|---|
| 2,831,319 | 4/1958 | Geary . |
| 3,098,352 | 7/1963 | Taub et al. . |
| 4,984,741 | 1/1991 | Nightingale . |
| 4,994,660 * | 2/1991 | Hauer ............................... 239/265.41 |
| 5,232,158 * | 8/1993 | Barcza ............................ 239/265.35 |
| 5,335,489 * | 8/1994 | Thayer .................................... 60/230 |
| 5,351,888 * | 10/1994 | Taylor et al. ...................... 239/127.3 |
| 5,398,499 | 3/1995 | Urruela . |
| 5,437,411 * | 8/1995 | Renggli ........................... 239/265.39 |
| 5,511,376 * | 4/1996 | Barcza ................................... 60/230 |
| 5,897,120 * | 4/1999 | Scavo et al. .......................... 277/628 |
| 6,102,307 * | 8/2000 | Elorriaga et al. ............... 239/265.39 |
| 6,195,981 * | 3/2000 | Hanley et al. ......................... 60/204 |

FOREIGN PATENT DOCUMENTS

| | | |
|---|---|---|
| 0060763 A1 | 9/1982 | (EP) . |
| 0557229 A1 | 8/1993 | (EP) . |
| 1025827 | 4/1953 | (FR) . |
| 1306588 | 2/1973 | (GB) . |

* cited by examiner

Primary Examiner—Charles G. Freay
Assistant Examiner—Ed Hayes
(74) Attorney, Agent, or Firm—Bacon & Thomas PLLC (57) ABSTRACT

An axially symmetric turbojet-engine exhaust nozzle which is directable as a unit. The exhaust nozzle is situated downstream of an exhaust duct (1) fitted with a spherical wall (5). A single control ring (12) driven by linear actuators (30) allows regulation of the nozzle cross section and direction. Converging flaps (7) are guided on an upstream side by the spherical wall (5) and are supported at a downstream side by a control lever (13) which hinges on the control ring (12) and rests upstream on an external surface (16) of the spherical wall (5). Diverging flaps (10) hinge on the converging flaps (7) to form an inner ring of hot flaps. The diverging flaps (10) are situated downstream in an extension of the converging flaps (7) and further hinge on an outer ring of cold flaps (11), which in turn hinge on the control ring (12). A synchronizing system connects upstream ends of the control levers (13) to the control ring (12) and ensures self-centering of the control ring (12), the outer ring of cold flaps (11) and the inner ring of hot flaps relative to the spherical wall (5).

10 Claims, 10 Drawing Sheets

AXISYMMETRIC, DIRECTABLE AND ADJUSTABLE TURBOJET-ENGINE EXHAUST NOZZLE

BACKGROUND OF THE INVENTION

1. Field of the Invention

The present invention relates to an axisymmetric, directable and adjustable turbojet-engine exhaust nozzle comprising, downstream of an exhaust duct having an axis X, an outer ring of cold flaps and an inner ring of hot flaps.

2. Description of the Related Art

Directable nozzles offer additional agility to combat aircraft. Furthermore, directable nozzles offer improved manoeuverability when pitching and yawing.

In general, the directable exhaust nozzle is mounted at the end of the exhaust duct using a swivel means having an external component which is pivotable on a sphere affixed to the exhaust duct by a first control means. Converging flaps are supported on the external component to be jointly driven by a second control means, anchored on the external component, to regulate the gas exhaust-cross-section.

Figure 11:
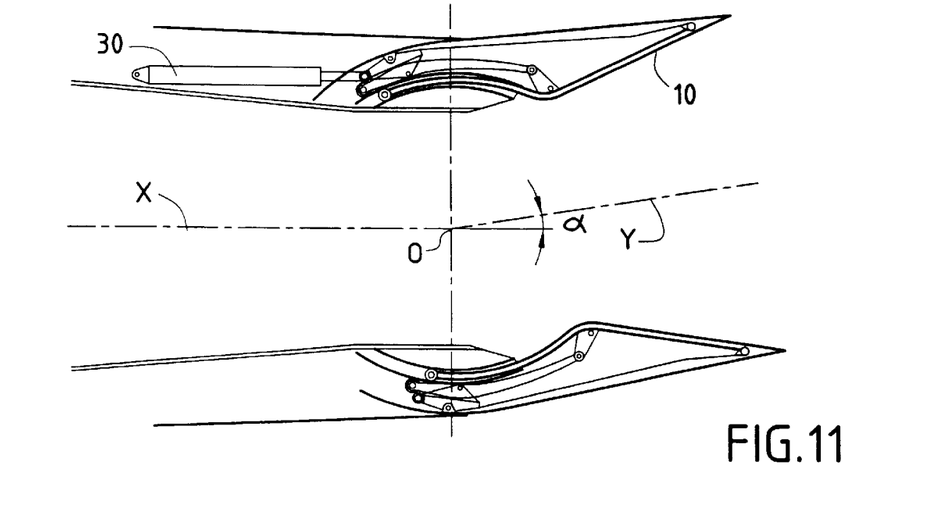

U.S. Pat. No. 4,984,741 issued to Nightingale shows such a nozzle which has converging flaps that are of arcuate longitudinal cross-section and slide on guides of the external component. When diverging flaps are arranged to hinge on the converging flaps, as indicated in FIG. 11 of Nightingale, a control ring is used which is driven by linear actuators anchored in the external component and connected by rods to the diverging flaps. The cold flaps are driven from the diverging flaps by linkrods.

SUMMARY OF THE INVENTION

Based on this state of the art, the objective of the present invention is to provide an axisymmetric exhaust nozzle which is directable as a unit wherein a single control mechanism implements nozzle orientation and regulation of nozzle cross-section as a function of flight conditions, thereby allowing design simplification and reduction in weight.

The nozzle according to the present invention has the following novel characteristics:
  the downstream end of the exhaust duct comprises a spherical wall with an axis X, the spherical wall being arranged to support the upstream ends of the converging flaps;
  a control ring encloses the spherical wall and is displaceable along the X axis and pivotable relative to the X axis by a control mechanism;
  the cold flaps hinge on one hand on the control ring and on the other hand on the downstream ends of the corresponding diverging flaps;
  the downstream end of each controlled converging flap is linked to a downstream end of a control lever hinging on the control ring, the upstream end of the control lever resting on an external surface of the spherical wall; and
  the upstream ends of the control levers are linked to the control ring by a synchronizing system which ensures self-centering of the control ring, the outer ring of cold flaps and the inner ring of hot flaps relative to the spherical wall.

Advantageously, the synchronizing system comprises a part hinging on the control ring for each pair of adjacent control levers so as to be pivotable about an axis which is perpendicular to the axis of the control ring. Further, the synchronizing system comprises a pair of linkrods which hinge on one of the parts and on the upstream end of the control lever of each pair of adjacent control levers.

In a first embodiment of the invention, the upstream ends of the converging flaps slide by two rollers arranged inside the spherical wall. The downstream end of each control lever hinges on the downstream end of a corresponding one of the converging flaps. The upstream end of each control lever rolls on an external surface of the spherical wall by one roller or caster-skid.

In a second embodiment of the invention, the upstream end of each control lever hinges on the upstream end of the corresponding one of the converging flaps. Again, the downstream end of each control lever hinges on the downstream end of the corresponding converging flaps. The upstream end of each converging flap rolls on the external surface of the spherical wall by two rollers or caster-skids.

In a variation of the second embodiment, each control lever is replaced by two linkrods which hinge on the control ring.

In a third embodiment of the invention, the upstream end of each control lever hinges on the upstream end of the corresponding converging flap. Again, the upstream end each converging flap rolls on the external surface of the spherical wall by two rollers or caster-skids. The downstream end of each control lever is connected to the corresponding converging flap by a first linkrod hinging on a lever. Each lever hinges on the corresponding converging flap and furthermore is connected by a second linkrod to a second ring. The second ring is situated downstream of the control ring and is affixed to the control ring by tierods such that the second ring absorbs at least a portion of pressure stresses exerted by the exhaust gases on the inner ring of flaps.

BRIEF DESCRIPTION OF THE DRAWINGS

Other advantages and features of the invention are elucidated in the following illustrative description of preferred embodiments, with reference to the attached drawings, in which.

DETAILED DESCRIPTION OF THE PREFERRED EMBODIMENTS

Figure 1:
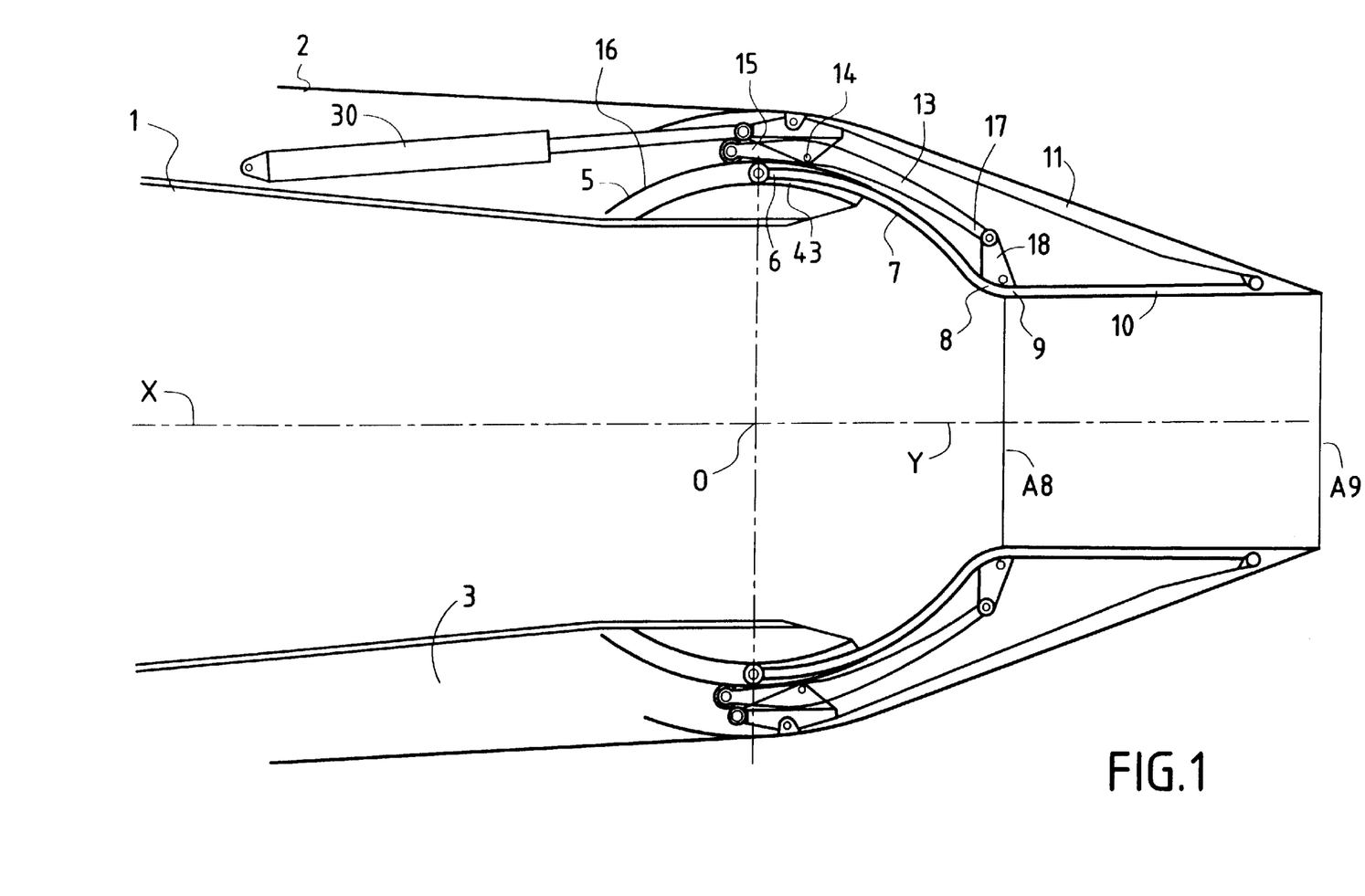
FIG. 1 is a vertical cross-sectional view taken in a plane through the turbine-engine axis of the rear body of a turbojet fitted with a directable, axisymmetric nozzle according to a first embodiment of the invention.
Figure 13:
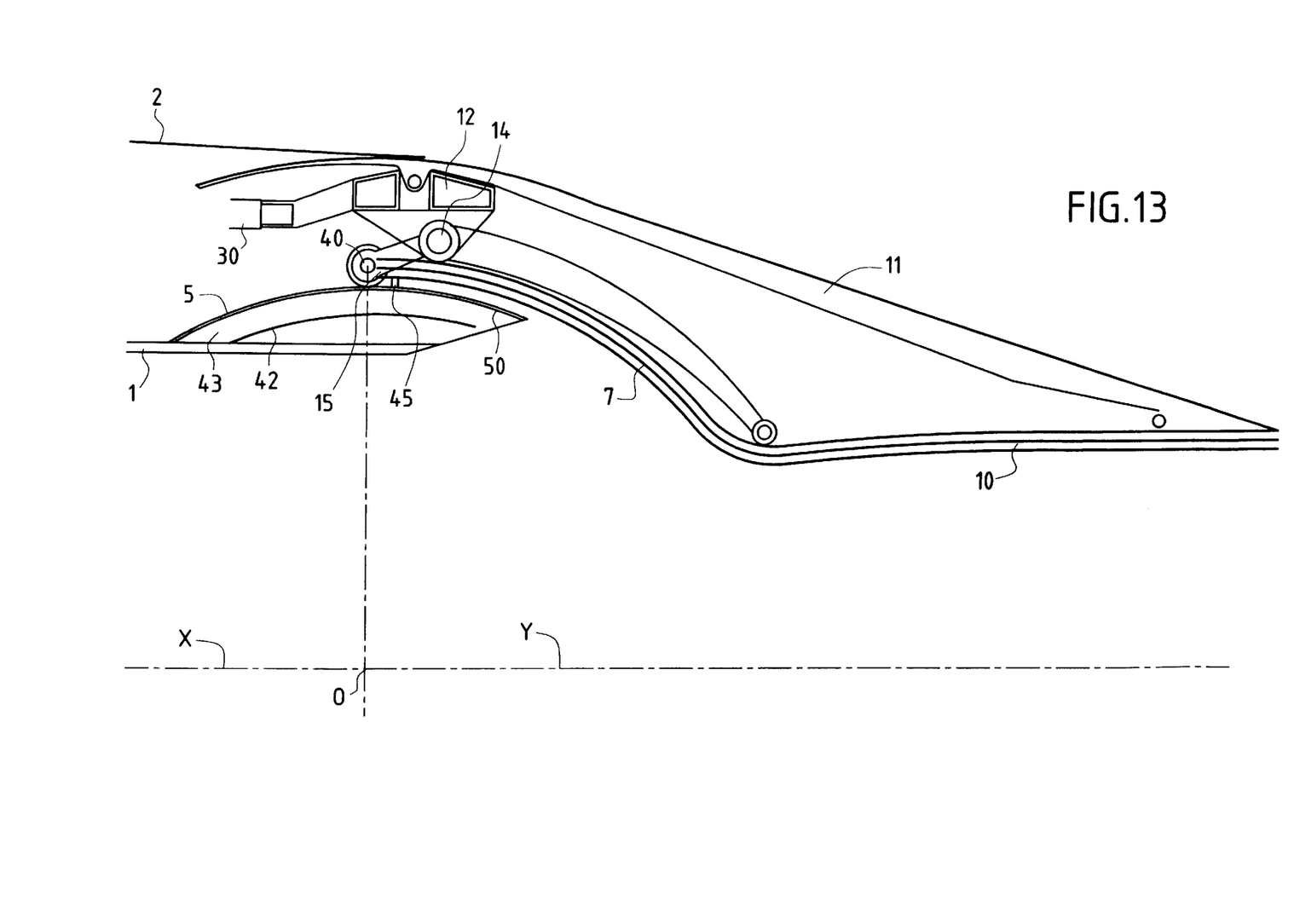
FIG. 13 is a half-sectional view taken in a plane through the turbine-engine axis of the rear body of a turbojet fitted with a directable, axisymmetric nozzle according to a second embodiment of the invention.
Figure 16:
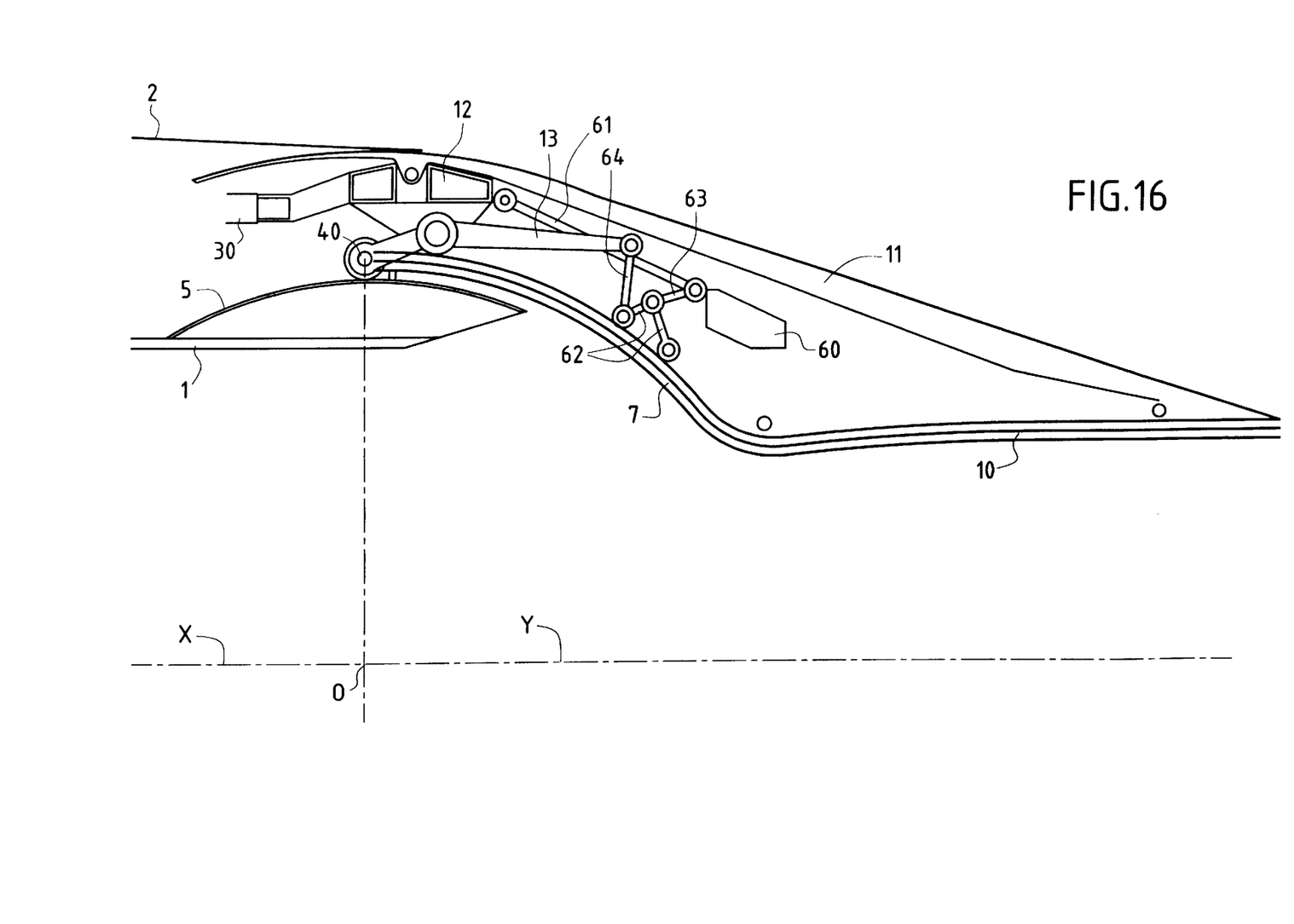
FIG. 16 is a half-sectional view taken in a plane through the turbine-engine axis of the rear body of a turbojet fitted with a directable, axisymmetric nozzle according to a third embodiment of the invention.

FIGS. 1, 13 and 18 each show the rear body of an aircraft turbine engine which is fitted downstream of the turbine with a gas exhaust duct 1 which constitutes a surface of revolution about an axis X and which is situated within an external casing 2. The exhaust duct 1 and the casing 2 bound an annular duct 3 therebetween wherein cooling air for the exhaust duct I circulates. The exhaust duct 1, for example, may be the external wall of an afterburner chamber.

The exhaust duct 1 is fitted at its downstream end with a spherical wall 5 situated within the annular duct 3. The spherical wall has its origin at O.

The upstream ends 6 of the controlled, converging flaps 7 come to rest against a surface of the spherical wall 5. The upstream ends 9 of the controlled, diverging flaps 10 hinge on the downstream ends 8 of the controlled, converging flaps 7.

In a manner known per se, diverging follower flaps and converging follower flaps are intercalated relative to the controlled, converging flaps 7 and the controlled, diverging flaps 10, respectively.

The converging flaps 7 and the diverging flaps 10 constitute two sets of flaps arranged in the extension of each other which hinge at a common junction to form an inner ring of hot flaps of a converging-diverging nozzle.

The converging-diverging nozzle is enclosed by a ring of cold flaps alternatingly consisting of controlled cold flaps and follower flaps. The cold flaps 11 hinge downstream on the controlled, diverging flaps 10 and upstream on a control ring 12 which surrounds the spherical wall 5.

The junction of the diverging flaps 10 and the cold flaps 11 constitutes the nozzle's exhaust cross section A9 whereas the junction of the converging flaps 7 and the diverging flaps 10 constitutes the nozzle's cross section A8, the nozzle throat.

An external part of the cold flaps 11 forms a continuous downstream contour with a fairing covering the casing 2.

The number of controlled converging flaps 7 is preferably equal to the number of controlled diverging flaps 10 and the number of controlled cold flaps 11.

Each controlled converging flap 7 is supported on the control ring 12 by a control lever 13 hinging at a pivot point 14 on the control ring 12. The upstream end 15 of each control lever rests in a sliding manner on an external surface 16 of the spherical wall 5.

As regards the embodiments shown in FIGS. 1 and 13, the downstream end 17 of each control lever 13 hinges on a bracket 18 which is rigidly joined to the downstream end 8 of one of the controlled converging flaps 7.

The upstream ends 15 of the control levers 13 furthermore are connected to the control ring 12 by a synchronizing system which ensures self-centering of the control ring 12, the outer ring of cold flaps and the inner ring of hot flaps relative to the spherical wall 5.

Figure 2:
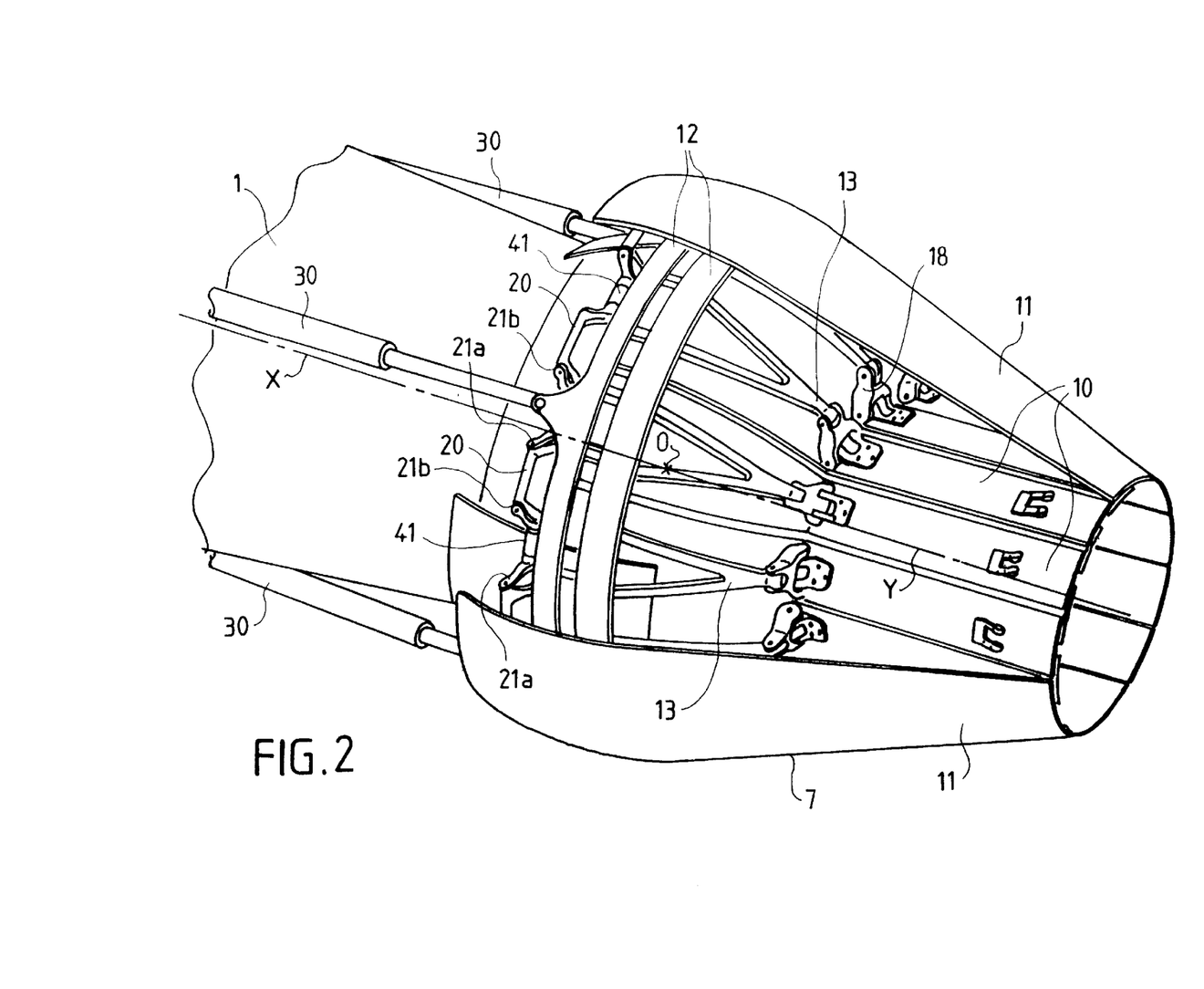
FIG. 2 is a perspective view of the nozzle shown in FIG. 1 with a partial cutaway.
Figure 12:
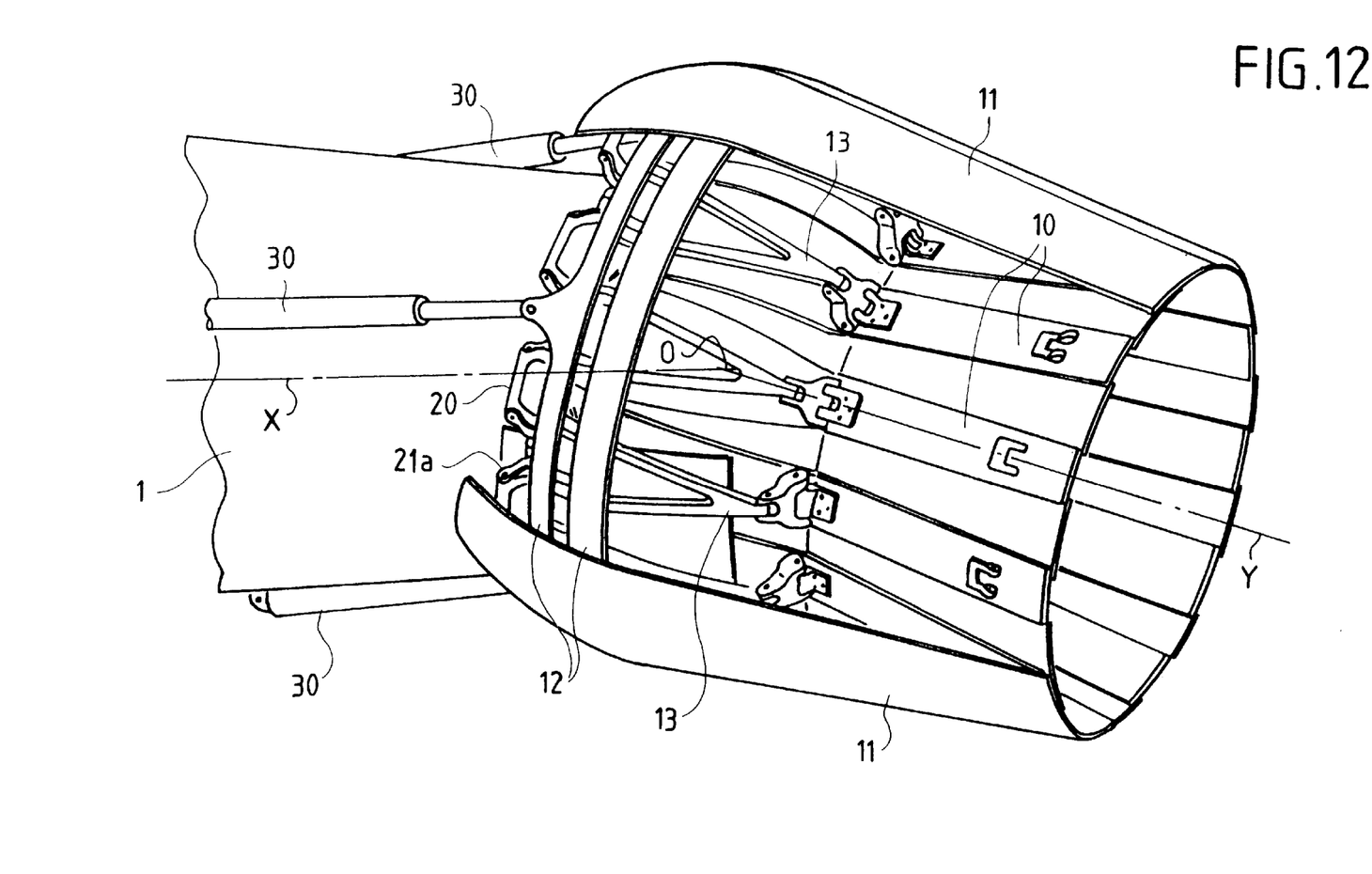
FIG. 12 is a view similar to FIG. 2 showing the nozzle shown in FIG. 1 in an open, downwardly-directed configuration.

As shown in FIGS. 2 and 12, the synchronizing system comprises, for each pair of adjacent control levers 13, a part 20 which hinges on the control ring 12 so as to be pivotable about a tangential axis which is perpendicular to an axis Y of the control ring 12. The synchronizing system furthermore comprises a pair of linkrods 21a, 21b which hinge on one of the parts 20 and on the upstream end 15 of one of the control levers 13.

The control ring 12 is preferably driven by a set of three linear actuators 30 which are anchored in a stationary structure of the rear body and equidistantly situated in the annular duct 3 about the axis X of the exhaust duct 1. Identical displacement of the three linear actuators generates translation of the control ring 12 and thereby reliably controls the cross sections A8 and A9 of the converging-diverging nozzle. However, a differential displacement of the linear actuators 30 will pivot the control ring 12 about the origin O of the spherical wall 5. As shown, the axis Y of the control ring 12 intersects the axis X at the origin O of the sphere 5 and may subtend an angle a up to about 20° with the axis X.

Because of the synchronizing system described above, the cross sections A8 and A9 are perfectly circular regardless of the desired directed position. Therefore, the behavior of the flaps 7, 10 and 11 shall be identical with that of an axisymmetric non-directable nozzle. The absence of relative displacement of the controlled flaps in the case of direction alone allows perfect support for the follower flaps and assures good nozzle sealing.

In the first embodiment shown in FIGS. 1 through 12, the upstream ends 6 of the converging flaps 7 are fitted with two rollers 40 which roll on an inner surface of the spherical wall 5. The upstream ends 15 of the control levers 13 are fitted with rollers 41 which roll on the external surface 16 of the spherical wall 5. A second spherical wall 42 is configured inside the first spherical wall 5 and functions as a heat shield.

Figure 3:
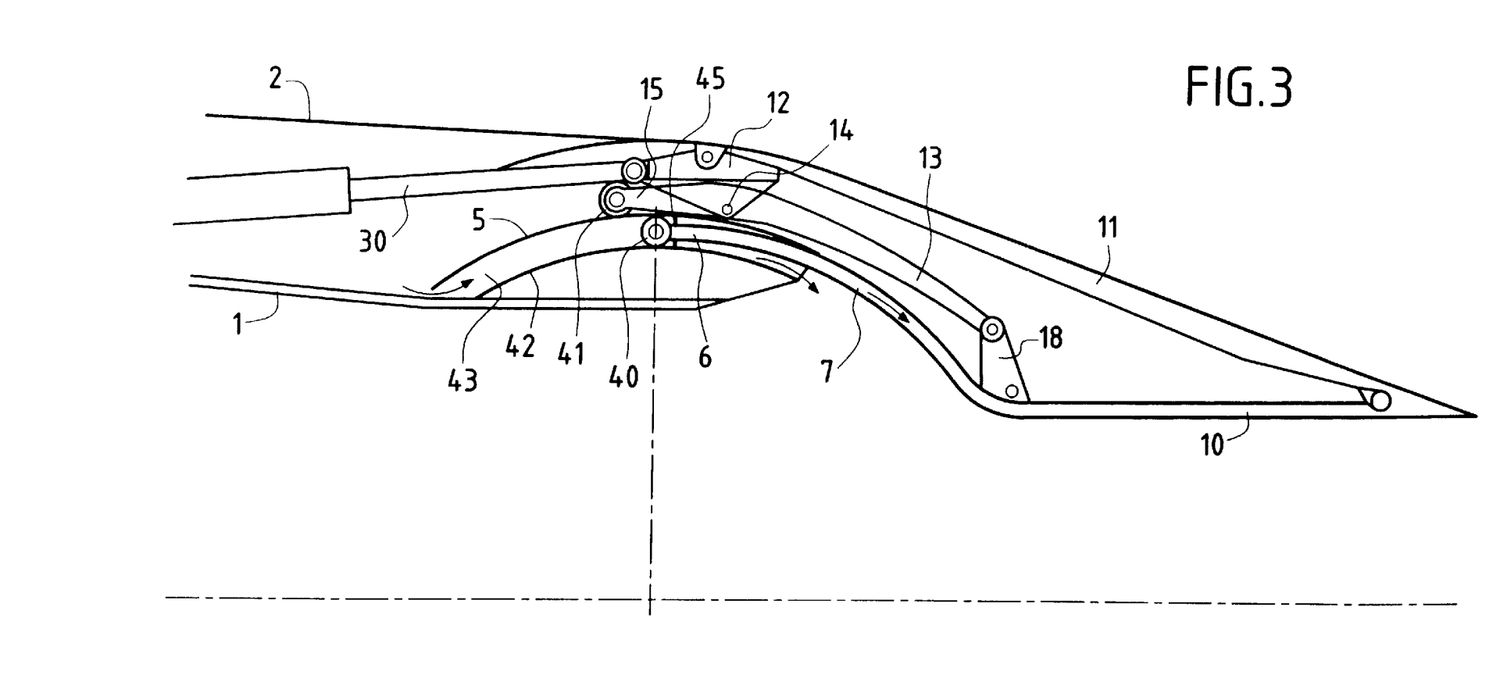
FIG. 3 is a half-sectional view showing the ventilation circuit of the nozzle shown in FIG. 1.
Figure 4:
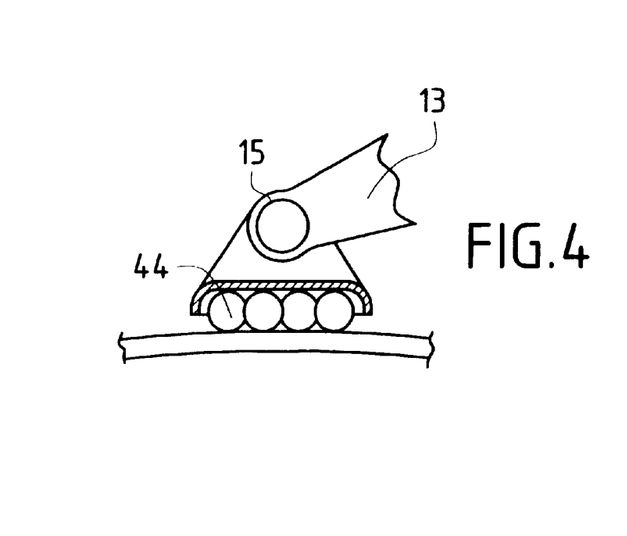
FIG. 4 is an enlarged, broken-away view of the upstream end of a control lever fitted with a caster-skid.
Figure 5:
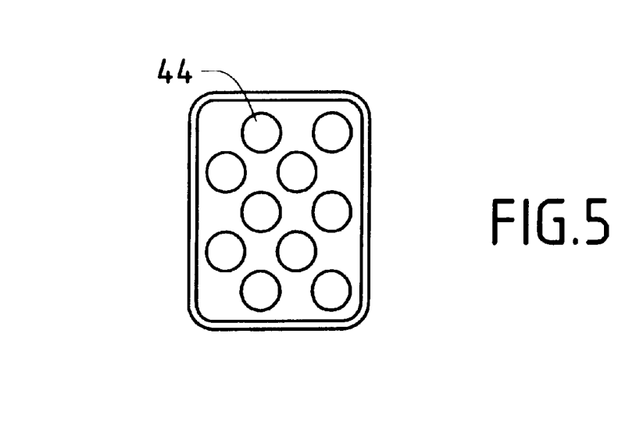
FIG. 5 is a radial or bottom view of the caster-skid shown in FIG. 4.
Figure 6:
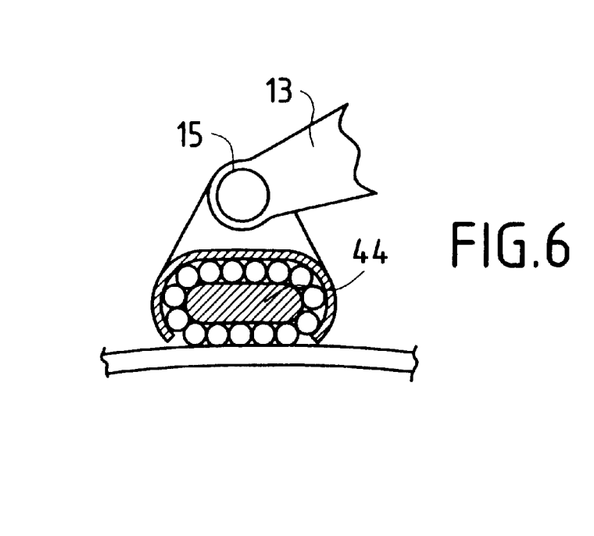
FIGS. 6, 7 view similar to FIGS. 4, 5 of another embodiment of the caster-skid.
Figure 7:
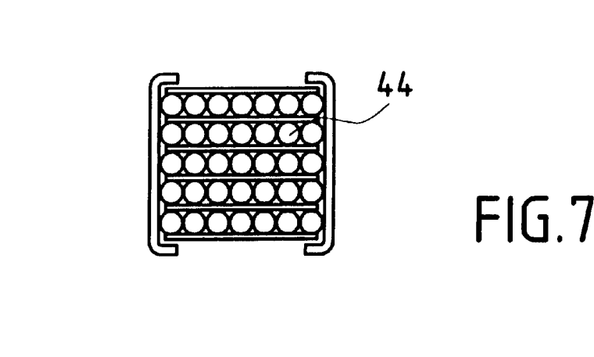

As shown in FIG. 3, air-tapping orifices 43 are provided to ventilate the space separating the two spherical walls 5 and 42. Part of this tapped air allows ventilation of the inside of the converging flaps 7 and diverging flaps 10. A brush seal 45 acts as a seal between the spherical wall 5 and the converging flaps 7.

Pressures applied by the exhaust gases on the inner surface of the converging flaps 7 and diverging flaps 10 bias the converging flaps 7 to pivot outwardly about the axis of the rollers 40. The resultant of the pressures applies an outward force on the downstream ends 17 of the control levers 13. To compensate for the outward force, the spherical wall 5 applies a corresponding outward force on the rollers 41 at the upstream end 15 of the levers 13.

To better spread contact pressure on the rollers 41 and to ensure improved sliding of the upstream ends 15 of the control levers 13 on the spherical wall 5, the rollers 41 may be replaced by caster-skids 44 as shown in FIGS. 4 through 7.

It should be kept in mind that the pressure stresses applied to the converging flaps 7 pass through the control levers 13 to the control ring 12 and onto the rollers 41 or the caster skids 44. The stress-resultant on the control ring 12 at the pivot points 14 being radial and the stresses on the rollers 41 or caster skids 44 being absorbed by the spherical wall 5, the control ring 12 is subjected only to axial stresses limited to the hinge action of the cold flaps 11. Therefore, the thrust required from the linear control actuators 30 is relatively small.

FIGS. 8 through 11 show various nozzle configurations for the above-described first embodiment.

Figure 8:
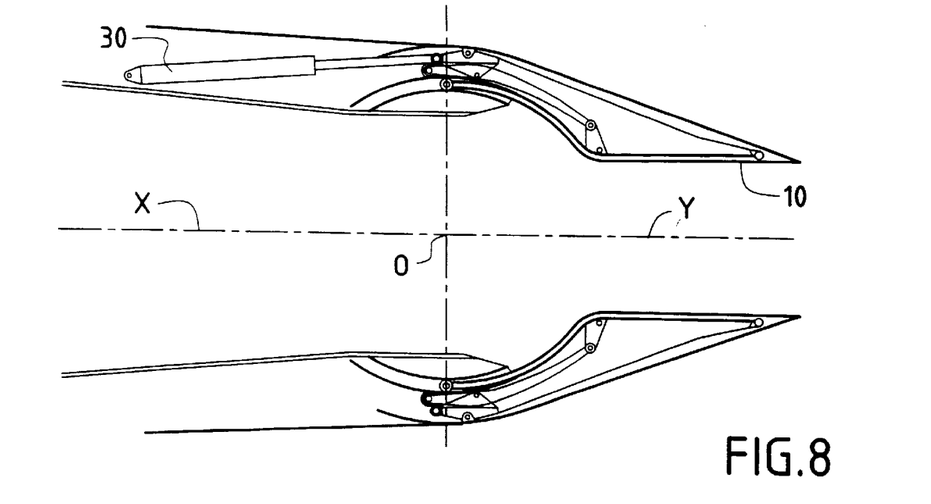
FIGS. 8–11 are sectional views of the nozzle shown in FIG. 1 in the closed, non-directed configuration, in the open, non-directed configuration, in the closed, downwardly-directed configuration, and in the open, upwardly-directed configuration, respectively.
Figure 9:
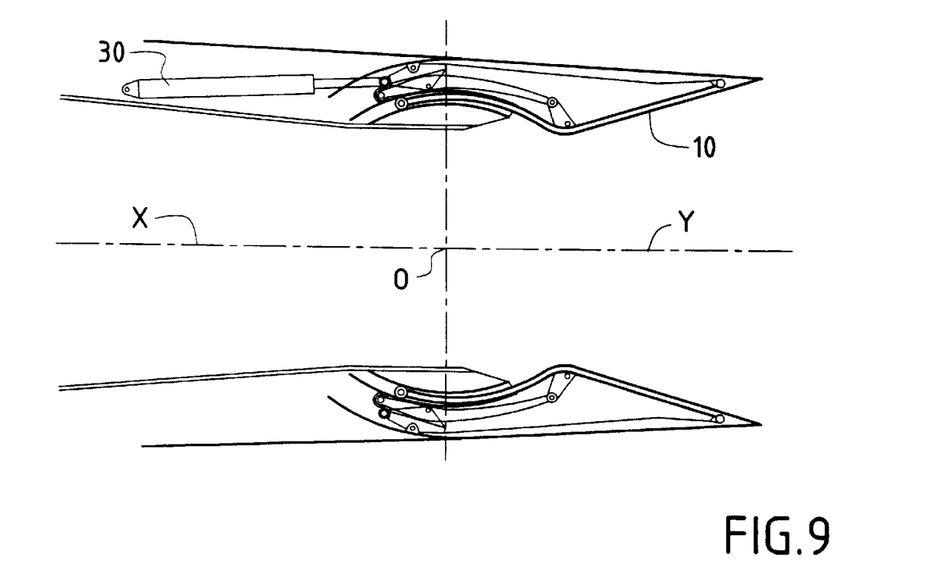
Figure 10:
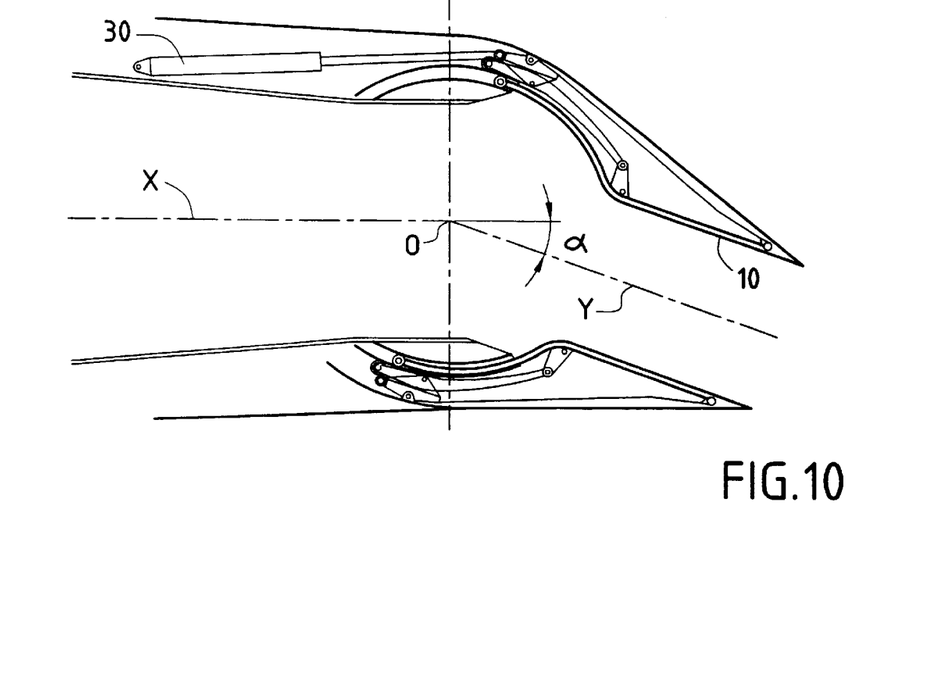

Starting form the non-directed, closed configuration of the nozzle shown in FIG. 8 wherein the three linear actuators 30 are each equally extended, identical retraction of the three linear actuators 30 moves the nozzle into the non-directed, open configuration shown in FIG. 9. Inversely, identical extension of the linear actuators 30 moves the nozzle from the non-directed, open configuration of FIG. 9 into the non-directed, closed configuration of FIG. 8. In the course of such identical extensions and retractions of the linear actuators 30, the follower flaps slide in a known manner relative to the controlled flaps.

On the other hand, differential displacements of the linear actuators 30 results in the control ring 12 pivoting about the origin O of the spherical wall 5, thereby ensuring that all the nozzle flaps shall pivot. In this manner, it is possible to move from the open or closed and non-directed configuration toward the open or closed directed configuration shown in FIGS. 10 and 11 without altering the position of the follower flaps relative to the controlled flaps.

Once the nozzle has been directed into a desired position, the cross section A8 of the nozzle throat may be changed by identically driving the three linear actuators 30.

FIG. 13 shows a second embodiment of the nozzle according to the present invention which differs from the first embodiment described above in that the upstream ends 6 of the controlled converging flaps 7 roll on the external surface 16 of the spherical wall 5 by two rollers 40. The upstream end 15 of each control lever 13 hinges on the upstream end 6 of the corresponding controlled converging flap 7.

The linkrods 21a and 21b of the synchronizing system also hinge on the upstream ends 6 of the controlled converging flaps 7. In this embodiment, the brush seals 45 are situated underneath the converging flaps 7.

The ventilating air circulates underneath the spherical wall 5 to purge the cavity between the spherical wall 5 and the second spherical wall 42 and to ventilate the inside of the converging flaps 7 and the diverging flaps 10 after passing through holes 50 in the spherical wall 5. The rollers 40 furthermore may be replaced by caster-skids 44 as shown in FIGS. 4 through 7.

The operation of the second embodiment of the invention is identical with the operation of the first embodiment. It should be noted, however, that the control levers 13 may be replaced by two linkrods hinging on the control ring 12 and respectively on the upstream and downstream ends of the controlled converging flaps 7.

FIG. 16 shows a third embodiment of the invention which differs from the second embodiment in that a mechanism is employed to decrease the force applied by the rollers 40 on the external surface 16 of the spherical wall 5. The mechanism is arranged to absorb at least part of the stresses exerted by the exhaust gases on the converging flaps 7.

The mechanism preferably comprises a second ring 60 situated downstream of the control ring 12 and firmly affixed to the control ring 12 by tierods 61. An L-shaped lever 62 hinges by one end on the downstream part of each controlled convergent flap 7. The lever 62 is connected in the middle by a first linkrod 63 to the second ring 60 and at a second end by a second linkrod 64 to the downstream end 17 of the corresponding control lever 13. The pressure stresses applied on the converging flaps 7 thus pass through the lever 62 into the linkrods 63 and 64.

Figure 14:
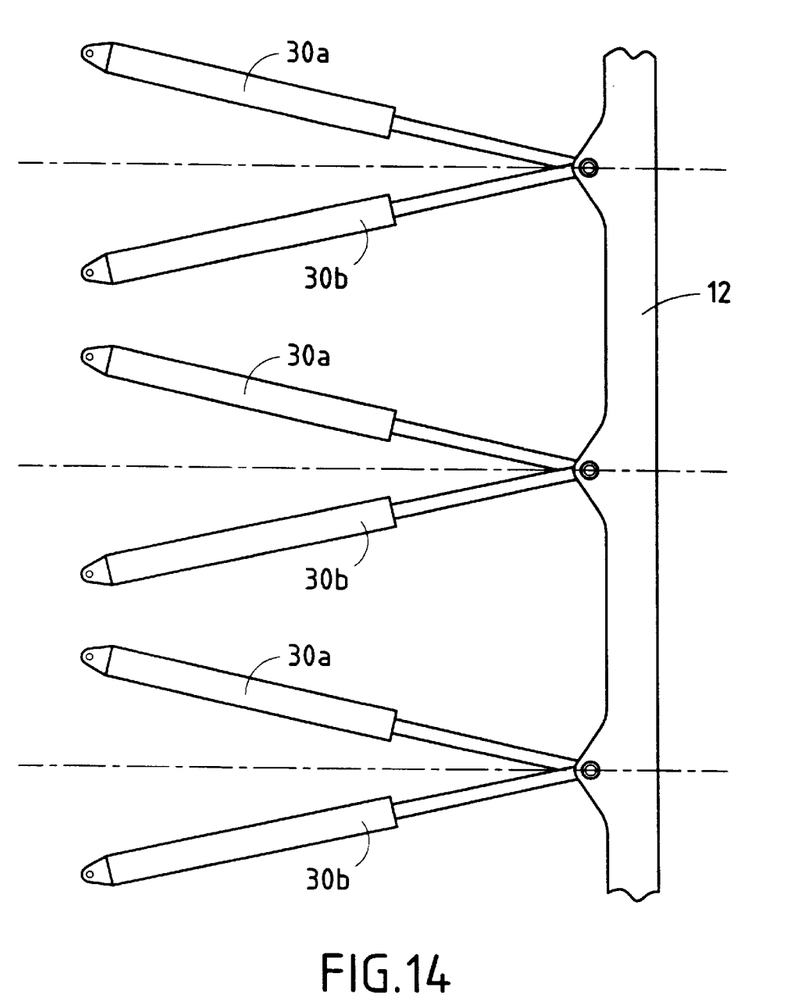
FIG. 14 is a geometric development of the configuration of the linear control actuators of the control ring.

FIG. 14 shows a particular configuration of the linear actuators for the control ring 12. Each linear actuator 30 is replaced by a pair of triangulated linear actuators. In each pair, there is a master linear actuator 30a and a follower linear actuator 30b. FIG. 14 shows that the master linear actuators 30a alternate along the pairs in order to prevent the nozzle from rotating about itself about the axis Y.

Figure 15:
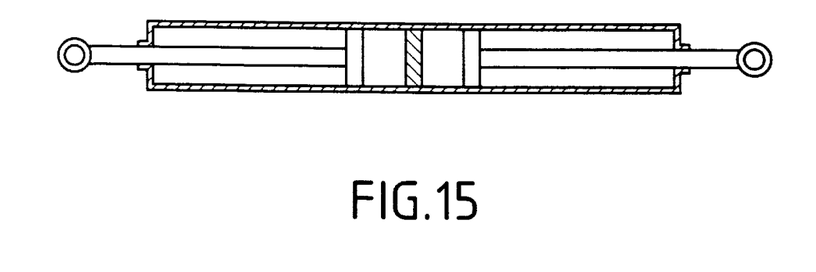
FIG. 15 shows a dual-chamber linear actuator which allows separation of the functions of adjusting the nozzle cross-section and directing the nozzle.

FIG. 15 shows a dual-chamber linear actuator 30 which allows separation of the control of the cross sections A8 and A9 from the control of the nozzle direction.

We claim:

1. An axisymmetric turbojet-engine exhaust nozzle which is directable as a unit, comprising:

an exhaust duct (1) through which exhaust gases flow, the exhaust duct (1) having an axis X;

an outer ring of cold flaps (11);

an inner ring of hot flaps which comprises a set of converging flaps (7) and a set of diverging flaps (10), the set of diverging flaps (10) being situated downstream in an extension of the set of converging flaps (7) and hinging therefrom;

a spherical wall (5) situated around the axis X at a downstream end of the exhaust duct (1) and supported thereby, an upstream end (6) of each of the converging flaps (7) being arranged to rest against the spherical wall (5);

a control ring (12) situated around an axis Y and enclosing the spherical wall (5), the control ring (12) being displaceable parallel to the axis X and pivotable relative to the axis X when acted on by a control mechanism (30), the cold flaps (11) hinging on the control ring (12) and on downstream ends of the diverging flaps (10);

a plurality of control levers (13) hinging on the control ring (12), each of the control levers (13) having an upstream end (15) which rests against an external surface (16) of the spherical wall (5) and a downstream end (17) which connects to a downstream end (8) of the converging flaps (7); and a synchronizing system which links the control ring (12) to the upstream end (15) of each of the control levers (13), the synchronizing system being arranged to ensure self-centering of the control ring (12), the outer ring of cold flaps (11) and the inner ring of hot flaps relative to the spherical wall (5).

2. The exhaust nozzle according to claim 1, wherein the downstream end (17) of each of the control levers (13) hinges on the downstream end (8) of a corresponding one of the converging flaps (7).

3. The exhaust nozzle according to claim 1, wherein the upstream end (15) of each of the control levers (13) hinges on the upstream end (6) of a corresponding one of the converging flaps (7).

4. The exhaust nozzle according to claim 3, wherein the downstream end (17) of each of the control levers (13) hinges on the downstream end (8) of a corresponding one of the converging flaps (7).

5. The exhaust nozzle according to claim 3, further comprising:

a lever (62) associated with and hinging on each of the converging flaps (7);

a first linkrod (64) hinging on each of the levers (62) so as to connect the downstream end (17) of each of the control levers (13) to the corresponding one of the converging flaps (7);

a second ring (60) situated downstream of the control ring (12) and firmly joined to this control ring (12) by tierods (61); and a second linkrod (63) connecting each of the levers (62) to the second ring (60) such that the second ring (60) is arranged to absorb at least a part of pressure stresses exerted by the exhaust gases on the inner ring of flaps.

6. The exhaust nozzle according to claim 1, wherein the synchronizing system comprises:
   a plurality of parts (20) arranged to hinge on the control ring (12) so as to be pivotable about a tangential axis which is perpendicular to the axis (Y) of the control ring (12); and
   a pair of linkrods (21a, 21b) associated with each of the parts (20), each pair of linkrods (21a, 21b) being arranged to hinge on one of the parts (20) and on the upstream ends (15) of an adjacent pair of the control levers (13).

7. The exhaust nozzle according to claim 6, wherein the downstream end (17) of each of the control levers (13) hinges on the downstream end (8) of a corresponding one of the converging flaps (7).

8. The exhaust nozzle according to claim 6, wherein the upstream end (15) of each of the control levers (13) hinges on the upstream end (6) of a corresponding one of the converging flaps (7).

9. The exhaust nozzle according to claim 8, wherein the downstream end (17) of each of the control levers (13) hinges on the downstream end (8) of a corresponding one of the converging flaps (7).

10. The exhaust nozzle according to claim 8, further comprising:
    a lever (62) associated with and hinging on each of the converging flaps (7);
    a first linkrod (64) hinging on each of the levers (62) so as to connect the downstream end (17) of each of the control levers (13) to the corresponding one of the converging flaps (7);
    a second ring (60) situated downstream of the control ring (12) and firmly joined to this control ring (12) by tierods (61); and
    a second linkrod (63) connecting each of the levers (62) to the second ring (60) such that the second ring (60) is arranged to absorb at least a part of pressure stresses exerted by the exhaust gases on the inner ring of flaps.

* * * * *

UNITED STATES PATENT AND TRADEMARK OFFICE
CERTIFICATE OF CORRECTION

PATENT NO.    : 6,276,126 B1  
DATED         : August 21, 2001  
INVENTOR(S)   : Bouiller et al.

It is certified that error appears in the above-identified patent and that said Letters Patent is hereby corrected as shown below:

<u>Title page,</u>  
Item [30], change "Mar. 19, 1999" to -- Mar. 10, 1999 --

Signed and Sealed this

Twenty-second Day of October, 2002

Attest:

Attesting Officer

JAMES E. ROGAN  
*Director of the United States Patent and Trademark Office*